(12) United States Patent
Meinders (10) Patent No.: US 7,693,014 B2
(45) Date of Patent: Apr. 6, 2010

(54) LASER BEAM RECORDER AND METHOD FOR CONTROLLING A LASER BEAM RECORDER

(75) Inventor: Erwin Rinaldo Meinders, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 385 days.

(21) Appl. No.: 11/574,743

(22) PCT Filed: Aug. 30, 2005

(86) PCT No.: PCT/IB2005/052835

§ 371 (c)(1),
(2), (4) Date: Mar. 6, 2007

(87) PCT Pub. No.: WO2006/027720

PCT Pub. Date: Mar. 16, 2006

(65) Prior Publication Data

US 2007/0253295 A1  Nov. 1, 2007

(30) Foreign Application Priority Data

Sep. 8, 2004  (EP) ................... 04104316

(51) Int. Cl.
*G11B 5/09* (2006.01)
(52) U.S. Cl. ............. 369/47.51; 369/47.48; 369/59.19; 369/53.2
(58) Field of Classification Search ........... None
See application file for complete search history.

(56) References Cited

U.S. PATENT DOCUMENTS

| 4,486,870 | A | 12/1984 | Pettigrew et al. |
|---|---|---|---|
| 4,967,286 | A | 10/1990 | Nomula et al. |
| 5,982,736 | A | 11/1999 | Pierson |
| 6,288,996 | B1 | 9/2001 | Siegel |
| 6,430,123 | B1 | 8/2002 | Mallary |
| 2001/0038588 | A1 | 11/2001 | Nagatomo et al. |
| 2002/0131359 | A1 | 9/2002 | Wood |
| 2003/0152017 | A1 | 8/2003 | Ito |
| 2004/0202083 | A1* | 10/2004 | Ogawa et al. ............ 369/59.25 |

FOREIGN PATENT DOCUMENTS

| EP | 0768650 A2 | 4/1997 |
|---|---|---|
| WO | 02079996 A1 | 10/2002 |

* cited by examiner

*Primary Examiner*—Muhammad N. Edun (57) ABSTRACT

The present invention relates to a method for controlling a LBR (Laser Beam Recorder) (56) suitable for mastering a record carrier (60) by writing data in the record carrier in circular or spiral tracks and comprising: means (58) for rotating a record carrier; means (62) for moving a laser (61) over the record carrier (60) in a radial direction with reference to the rotation of the record carrier (60); means (65) for controlling the laser output power; and means (66) for synchronizing the rotation of the record carrier (60), the movement of the laser (61) and the laser output power. In accordance with the invention synchronizing the rotation of the record carrier 60; the movement of the laser 61 and the laser output power is performed such that at least a part of the data is written in at least one track comprising a different arrangement than circular or spiral. The present invention also relates to a Laser Beam Recorder.

16 Claims, 9 Drawing Sheets

LASER BEAM RECORDER AND METHOD FOR CONTROLLING A LASER BEAM RECORDER

FIELD OF THE INVENTION

The present invention relates to a method for controlling a LBR (Laser Beam Recorder) suitable for mastering a record carrier by writing data in the record carrier in circular or spiral tracks and comprising: means for rotating a record carrier; means for moving a laser over the record carrier in a radial direction with reference to the rotation of the record carrier; means for controlling the laser output power; and means for synchronizing the rotation of the record carrier, the movement of the laser and the laser output power. Furthermore, the present invention relates to a Laser Beam Recorder suitable for mastering a record carrier by writing data in the record carrier in circular or spiral tracks and comprising: means for rotating a record carrier; means for moving a laser over the record carrier in a radial direction with reference to the rotation of the record carrier; means for controlling the laser output power; and means for synchronizing the rotation of the record carrier, the movement of the laser and the laser output power.

BACKGROUND OF THE INVENTION

A main advantage of optical storage is the cheap replication of ROM media. A major disadvantage of conventional optical storage concepts is the presence of rotating parts in the optical drives. Rotating parts have a lot of disadvantages, for example a sensitivity to wear, a creation of noise due to rotation, a consumption of rather high electrical power, in particular at high rotation speeds, etc. For example, the T-ROM concept, based on the Talbot effect, was proposed as an optical readout principle without rotating parts for use in an optical card system. This concept is based on a two-dimensional periodic light interference pattern that is generated through a matrix of equidistantly spaced holes. The optical card (for example a ROM medium) is located in this matrix of multiple light sources and a detector, for example a CCD-like detector. The optical card, i.e. the optical record carrier, is readout in a transmission mode. The unwritten areas transmit more light than the written areas (for example pits) or the other way around. In this way, binary data encoded in the transmission level of the different pixels can be readout. A main challenge is the manufacturing of suitable ROM media for such readers.

Laser Beam Recorders are well known in connection with the production of glass masters which form the basis for providing stampers used to replicate for example CDs or DVDs. In conventional mastering, a thin photosensitive layer, spincoated on a glass substrate, is illuminated with a modulated focused laser beam in a Laser Beam Recorder. The modulation of the laser beam causes that some parts of the disc are being exposed by UV (or another wave length) light while the intermediate layers between the exposed areas (pits) remain unexposed. While the disc rotates and the focused laser beam is smoothly pulled to the outer side of the disc, a spiral of alternating illuminated areas remains, wherein it is also known to arrange the data in a circular arrangement. In other words, with known Laser Beam Recorders the data is arranged in spiral or circular tracks. Subsequently, the exposed areas are being developed in a so-called development process. Under influence of photons, acids are formed that dissolve in the base development liquids. This dissolution results in physical holes inside the photoresist layer. The layer thickness is a natural barrier for the created holes since the used glass is insensitive to UV exposure and the subsequent development liquid. Subsequently, a Ni layer is sputter-deposited on top of the patterned photoresist layer. This Ni layer is galvanically grown such that a rather thick stamper with inverse pit structure remains. This stamper is used to replicate discs, either via injection molding with, for example, polycarbonate or via a glass/2P replication process.

It is also possible to make a relief structure with phase-transition materials. These inorganic materials obtain a different morphology/lattice structure due to laser-induced heating. The thermally degraded and the initial phases have different dissolution rates when in contact with an etch liquid like alkaline liquids (KOH and NaOH) and acids (like HCl and HNO3). For example, amorphous areas may be written in an initially crystalline phase-change layer. Either the amorphous marks or the crystalline background material dissolves faster such that a relief structure remains. The phase-change layer is embedded in a phase-change recording stack, further comprising a metal heat sink layer and dielectric layer to fine-tune optical contrast and thermal response during writing. The phase-transition layer may also be used as a mask layer in combination with an etchable underlayer. Phase-transition mastering is an interesting candidate to further increase the density of a relief structure. With conventional electro-chemical plating, a stamper or metallic negative is made from the patterned relief structure. This stamper is made to replicate the pit structure in a polycarbonate disc or 2P/glass disc.

It is the object of the present invention to broaden the application area of Laser Beam Recorders, particularly, but without being limited thereto, such that stampers for creating optical cards of the type mentioned at the beginning may be produced.

SUMMARY OF THE INVENTION

This object is solved by the features of the independent claims. Further developments and preferred embodiments of the invention are outlined in the dependent claims.

In accordance with a first aspect of the present invention, the method for controlling a Laser Beam Recorder of the type mentioned at the beginning comprises the step: synchronizing the rotation of the record carrier, the movement of the laser and the laser output power such that at least a part of the data is written in at least one track comprising a different arrangement than circular or spiral.

In accordance with a second aspect of the present invention the object mentioned above is solved by a Laser Beam Recorder of the type mentioned at the beginning, wherein the means for synchronizing the rotation of the record carrier, the movement of the laser and the laser output power are adapted to perform synchronization such that at least a part of the data is written in at least one track comprising a different arrangement than circular or spiral.

Thereby, nearly any two-dimensional relief structures can be formed, for example a rectangular matrix of data pits arranged in a Cartesian-like grid. This for example results in a circular disc that can be produced by conventional mastering machines controlled and adapted, respectively, in accordance with the present invention, wherein a rectangular cut-out will provide the desired card with a rectangular matrix of data pits. It is preferred that at a fixed reference point in time the rotation of the disc is synchronized with the laser pulse pattern. If the disc, i.e. the record carrier, rotates at a constant angular velocity, the time of a revolution is fixed, namely T=1/f, f being the rotational frequency of the disc (angular frequency $\omega=2\pi f$). The delay between the reference point in time and a pit P(i, j) is $t=\theta/\omega$. At time t, the write pulse is fired to write pixel or pit P(i, j). Alternatively, it is also possible to operate the Laser Beam Recorder in a constant linear velocity mode. In this case the angular velocity is adapted to obtain a constant linear velocity at all radii.

While the following features in most instances are only claimed in connection with the method of the invention, it is clear to the person skilled in the art, that these features may also be used advantageously in connection with the Laser Beam Recorder in accordance with the present invention.

It is preferred that for writing the part of the data a mapping between Cartesian coordinates and polar coordinates is performed. For a known data pattern, the to be written pits are known in terms of Cartesian coordinates. These locations of the pits (or any other data structure) can be transformed to polar coordinates (angle and radius) once the origin of the pattern is fixed. Subsequently the laser pulse train can be defined and synchronized with the rotation of the disc.

Without being limited thereto it is for example possible that the at least one track comprises an arrangement of a straight line. Tracks in the form of straight lines (especially equidistantly spaced parallel lines) are for example useful in connection with the production of optical cards intended to be read-out without rotation.

For many fields of application it is preferred that the part of said data is provided in the form of pits. In most cases the physical pits will be formed via the conventional development and etching processes. However, it is also within the scope of the invention that the physical pits are directly formed by ablation.

For example in connection with data arranged in a Cartesian-like grid it is preferred that the pits are located at intersections of virtual lines lying in the plane of the record carrier and virtual columns lying in the plane of the record carrier.

In some fields of application it may be advantageous that at least some of the pits overlap. If numerous circularly shaped spots overlap, pits (much) larger than the optical spot of the laser can be written. This for example may be of interest for the first generation optical card readers in which the data resolution may be limited by the readout channel of the reader.

In accordance with a further embodiment of the present invention it is possible that at least some of the pits have different depths. By providing pits having different depths it is possible to create ROM media with basically more than two transmission/reflection levels to increase the data density.

In this connection it is preferred that at least part of said data is provided in the form of pits having different depths, wherein the record carrier comprises a first recording layer and at least a second recording layer between which there is provided a physical barrier leading to discrete pit depths. The recording layers are preferably made of photoresist material. It is to be noted that the invention is not limited to using only two recording layers for creating two different depths levels, but embraces also record carriers having more than two recording layers for providing a corresponding number of different transmission/reflection levels. In accordance with a first general solution the physical barrier comprises an interface layer that breaks down by a predetermined break down mechanism, particularly by a photo-chemical reaction or a thermal effect. It should be clear that in cases where more than two recording layers are provided a suitable interface layer is preferably arranged between all adjacent recording layers. In cases where the break down mechanism is a thermal effect, the optical properties of the record carrier for example change due melting, thermal degradation or other thermal alteration mechanism. A further development of the first general solution is that the interface layer is bleachable by a certain amount of photons, wherein the bleached material is solvable in a developer used in the photo-chemical reaction. It is also possible that the interface layer is an inhibition layer which becomes sensitive above a predetermined laser power. For example, a first photoresist layer can be spincoated, baked and treated with a pre-development. Then, a second photoresist layer is spincoated and baked. The inhibition layer was initially part of the first photoresist layer but obtained different chemical (and optical) properties due to the treatment with the development liquid during the pre-development. The interface layer is preferably made from a material selected from the following group: PMMA, silicon nitride, aluminum nitride, ZnS—SiO2. In accordance with a second general solution the physical barrier is formed in that the first recording layer and the second recording layer are made from intrinsic different materials. In this case the different recording layers are for example spincoated or deposited on top of each other. For example, the first recording layer and the second recording layer may comprise different photosensitive compounds. Furthermore, it is possible that the first recording layer and the second recording layer comprise different compositions. Additionally or alternatively it is possible in connection with the second general solution that the first recording layer and the second recording layer comprise different sensitivities with respect to laser (for example deep UV) illumination. It is for example possible to spincoat a photoresist having a lower sensitivity onto a substrate to form a second recording layer, and to subsequently spincoat a photoresist having a higher sensitivity onto the second recording layer to form a first recording layer, wherein in this case the second recording layer is only reached at high laser power levels. Another possibility is that the first recording layer and the second recording layer comprise different sensitivities with respect to a photo-chemical development. It is also possible that the first recording layer and the second recording layer comprise different sensitivities with respect to different etching agents. For example, the first recording layer may be formed by a photoresist and the second recording layer may be formed by a glass substrate.

A multi-level relief structure can also be formed with phase-transition materials. In that case, more phase-transition recording layers are combined in one recording stack. The application of different power levels results in writing of marks in the first recording layer (low laser power) or in the second recording layer (high laser power). The well-known phase-change materials are very suitable to make a two-level relief structure. A recording stack for such a two-level structure comprises a first dielectric layer, a first phase-change layer, a first interface layer, a second phase-change layer, a second interface layer and a metal heat sink layer.

The invention also embraces solutions where the part of data is written in the form of a straight line comprising local broadenings. For example the data may be provided in form of continuous grooves with local broadenings, wherein the broadenings are obtained via laser pulses that are super-imposed on a continuous laser power.

Additionally or alternatively it is possible that the part of data is written in the form of a straight line comprising local necks. For example continuous grooves with local narrowings may be formed, wherein these narrowings are obtained via laser power variation.

Without being limited thereto it is preferred that the record carrier is intended to be used in connection with the creation of a stamper. A stamper is typically a nickel substrate with protruding bumps representing the data. After the data is written in the record carrier the exposed/illuminated areas are chemically removed via etching, such that physical pits remain in the resist layer. The obtained relief structure is provided with a sputter-deposited metallic layer, preferably nickel. This Ni layer is grown to a thick and manageable substrate via electro-chemical plating. The Ni substrate is separated from the master substrate to end up with the stamper. The stamper may for example be used subsequently to replicate optical storage media.

In this context it is especially possible that the stamper is intended to be used for producing optical record carriers which are intended to be readout without being rotated. The optical record carriers may for example be optical cards intended to be readout via the Talbot effect as mentioned at the beginning.

In accordance with a different field of application the stamper is intended to be used for printing, especially for micro-contact printing.

To further increase the data density it is possible that the track is a meta-track comprising a two dimensional data layout. The two-dimensional data storage in the disc plane is a novel way to increase capacity. The anticipated data capacity of a two-dimensional data storage is estimated to be at least at a factor 2.

These and other aspects of the invention will be apparent from and elucidated with reference to the embodiments described hereinafter.

DESCRIPTION OF PREFERRED EMBODIMENTS

Figure 1:
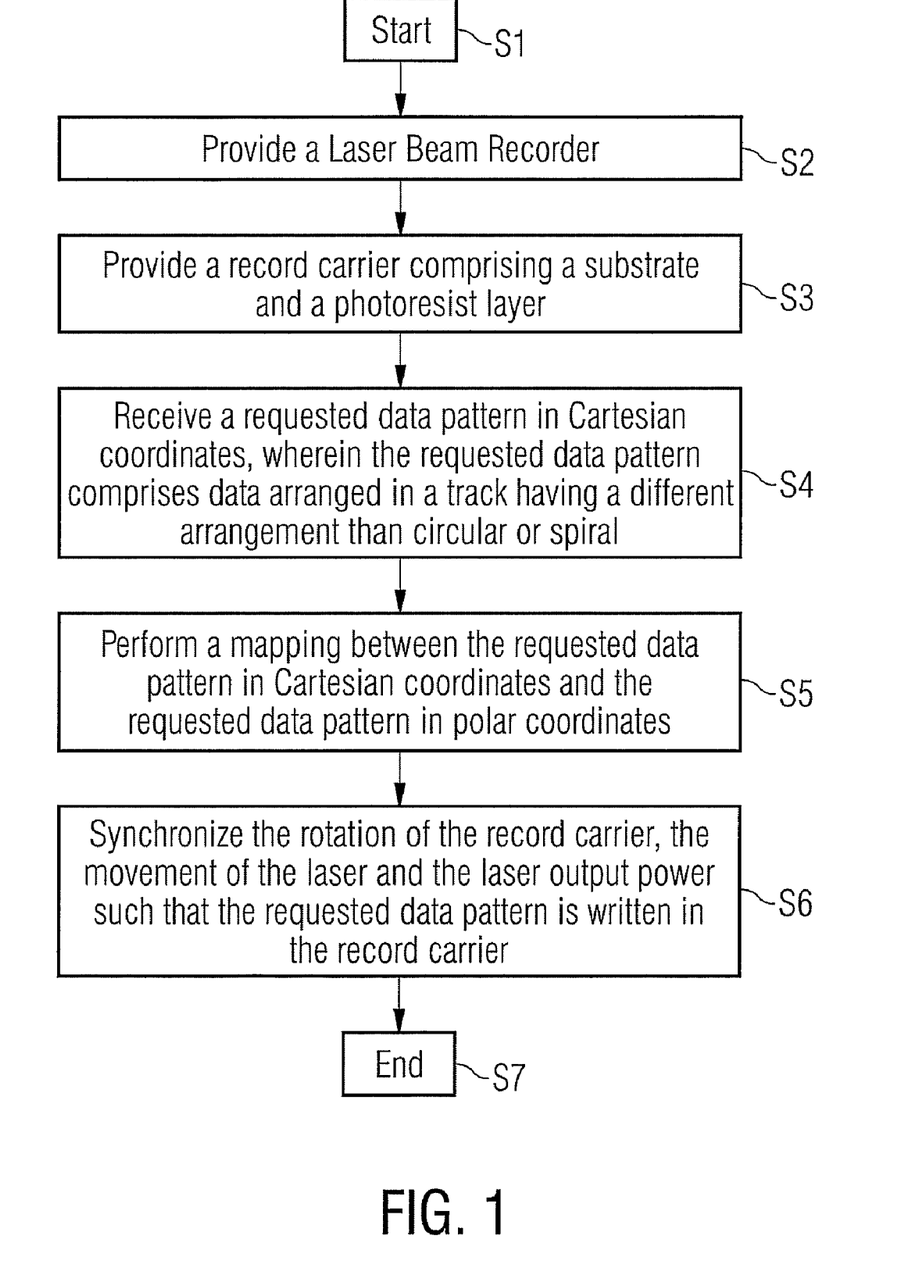
FIG. 1 is a flow chart illustrating an embodiment of the method in accordance with the invention.

FIG. 1 is a flow chart illustrating an embodiment of the method in accordance with the invention. The illustrated method starts in step S1. In step S2 a Laser Beam Recorder is provided which will be described in greater detail with reference to FIG. 2. Instep S3 a record carrier comprising a substrate and a recording stack is provided. For conventional mastering, the recording stack comprises a photoresist layer. It should be clear that optionally other layers may also be provided, for example layers to improve the absorption of the laser light and to improve the pit shape. It is also possible to use a master substrate based on phase-transition materials. Furthermore, it should be clear that in cases where pits comprising different depths are to be created, record carriers comprising a corresponding number of recording layers may be used. In step S4 a requested data pattern is received in Cartesian coordinates. The requested data pattern comprises data arranged in a track having a different arrangement than circular or spiral. In step S5 a mapping between the requested data pattern in Cartesian coordinates and the requested data patterned in polar coordinates is performed. As is it well known, between Cartesian and polar coordinates there exists the following relation: $x=R\cos(\theta)$ and $y=R\sin(\theta)$. In step S6 the rotation of the record carrier, the movement of the laser and the laser output power is synchronized such that the requested data pattern is written in the record carrier. The method depicted in FIG. 1 ends in step S7.

Figure 2:
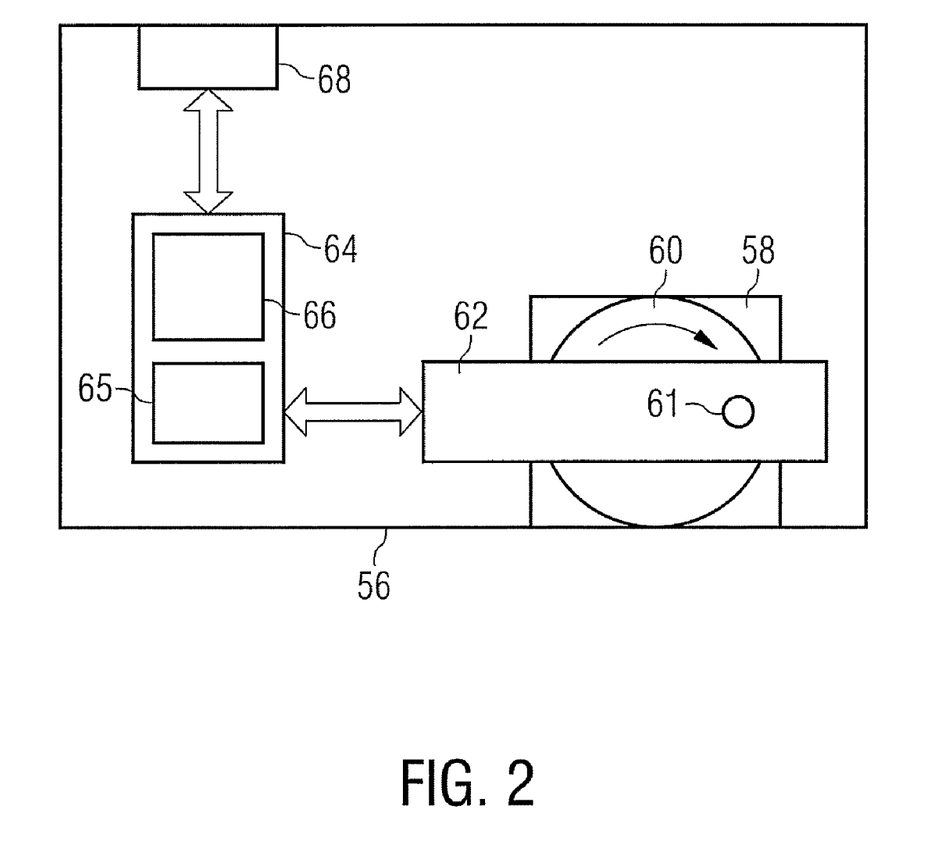
FIG. 2 schematically illustrates a Laser Beam Recorder in accordance with the invention, wherein the Laser Beam Recorder is also suitable to carry out the method in accordance with the invention.

FIG. 2 schematically illustrates a Laser Beam Recorder in accordance with the invention, wherein the Laser Beam Recorder 56 is also suitable to carry out the method in accordance with the invention. The Laser Beam Recorder 56 comprises means 58 for rotating a record carrier 60. A laser 61 is movable in the radial direction with respect to the rotation of the record carrier 60 by means 62. Furthermore, there is provided a controller 64 for controlling the operation of the Laser Beam recorder 56. The controller 64 is coupled to an interface 68 for receiving the requested data pattern in Cartesian coordinates. The controller 64 (beside the typical circuitry which is not shown) comprises means 65 for controlling the laser output power and means 66 for synchronizing the rotation of the record carrier 60, the radial movement of the laser 61 and the laser output power such that at least a part of the data is written in at least one track comprising a different arrangement than circular or spiral. The controller 64 preferably is realized on the basis of at least one micro processor interacting with suitable software. At least in some cases it is regarded as possible to enable existing Laser Beam Recorders to realize the present invention only by a firmware upgrade. In other cases it will be necessary to exchange or add hardware to enable an existing Laser Beam Recorder to carry out the present invention.

Figure 3A:
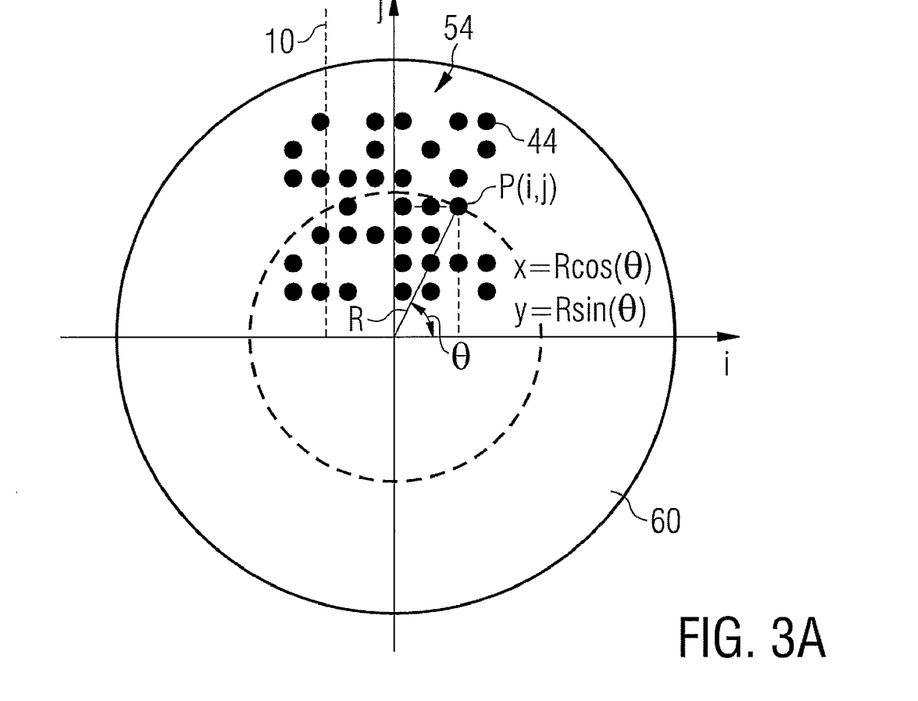
FIG. 3A illustrates a record carrier comprising a rectangular matrix of pits.

FIG. 3A shows an example of a rectangular data pattern 54 of pits 44 written on a record carrier 60. The Cartesian coordinates of a pit P(i, j) are $x=R\cos(\theta)$ and $y=R\sin(\theta)$. The rectangular data pattern 54 is created by writing the pits in straight tracks, wherein only one track 10 is shown.

Figure 3B:
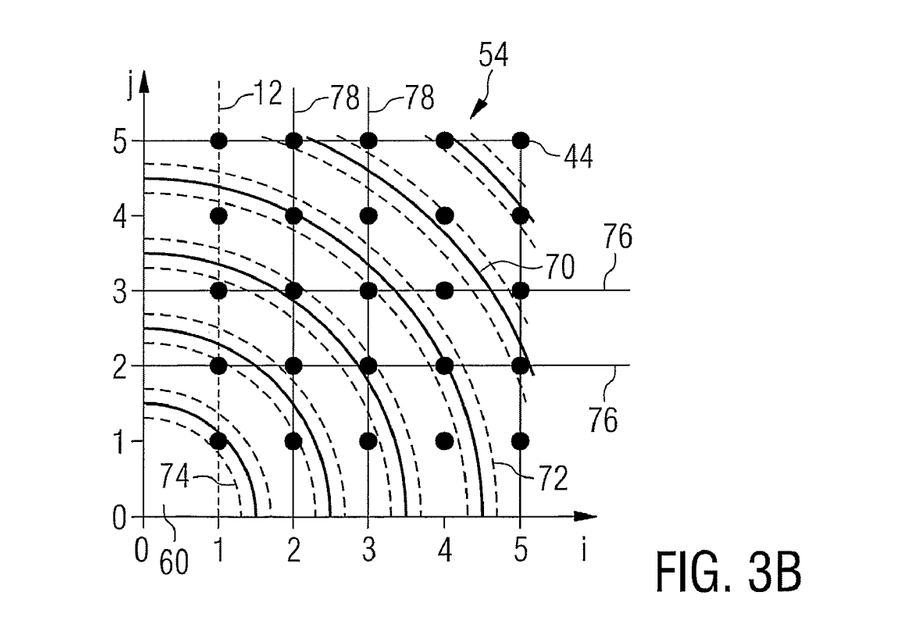
FIG. 3B illustrates the writing of the marks by positioning the laser at a nominal position imposed by the track-pitch of a spiral, and at a deviated position with respect to the nominal position, for example by using a deflector.

FIG. 3B shows an example of a rectangular data pattern 54 of pits 44 that is written on a record carrier 60. The pits are arranged at intersections of lines and columns of which only two lines 76 and two lines 78 are shown. In this case, the columns form straight tracks of which one track is indicated at 12. The focused laser spot can in fact cover the entire master substrate in case there is an infinite time and place resolution. To write the data pattern 54 the Laser Beam Recorder is operated such that the laser spot is slowly moved outwards, such that a spiral is written. The central spiral of the focused spot is indicated at 70. The width between the outer bounds 72, 74 of the focused laser spot is determined by the deflection amplitude. To write a two-dimensional grid of pits or another rectangular relief structure, an optimum track pitch (determined by the radial velocity and the angular velocity) and time resolution of the write pulses need to be found. In addition, the deflector in a Laser Beam Recorder, which causes an off-track deviation of the beam, can also be used to control the mapping from cylinder to Cartesian coordinates more accurately. Furthermore, it is possible to modulate the laser beams such that marks of different lengths are written. In case a master substrate with pre-grooves is used for mastering, it is also possible to obtain the deviation of the nominal position indicated at 70 by a deliberate offset in the push-signal that causes a slight off-centerplacement of the optical spot. If the deviation equals half the track pitch (=TP/2) the entire surface of the record carrier can be covered within one passage of the laser spot. In that case, a very accurate rectangular grid of data pits can for example be written.

Figure 4A:
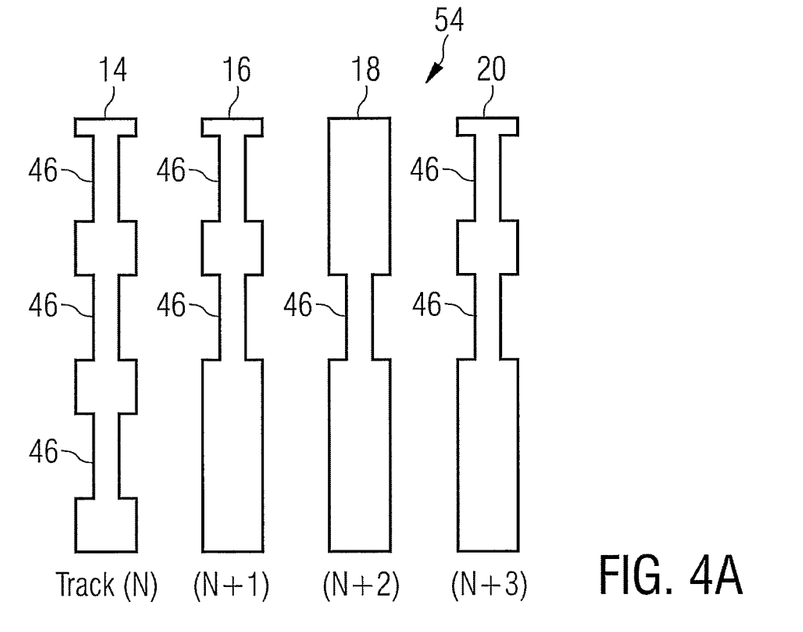
FIG. 4A illustrates data lines with pre-recorded pits.
Figure 4B:
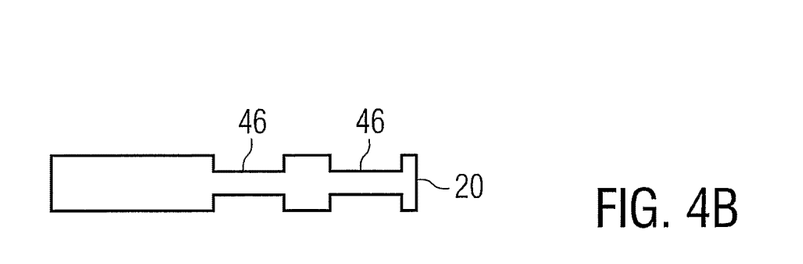
FIG. 4B shows the data line 20 of FIG. 4A.
Figure 4C:
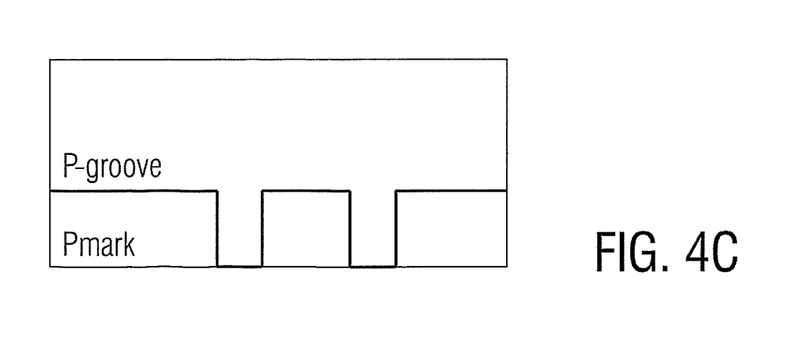
FIG. 4C shows the laser pulse pattern used to create the data line in accordance with FIG. 4B.

FIG. 4A illustrates data lines with pre-recorded pits, FIG. 4B shows the data line 20 of FIG. 4A and FIG. 4C shows the laser pulse pattern used to create the data line in accordance with FIG. 4B. As regards the write strategy, the pulse power is not given as a function of time but as a function as the Cartesian coordinates. The pulse power as a function of time is derived from the mapping that follows from the synchronized writing.

Figure 5A:
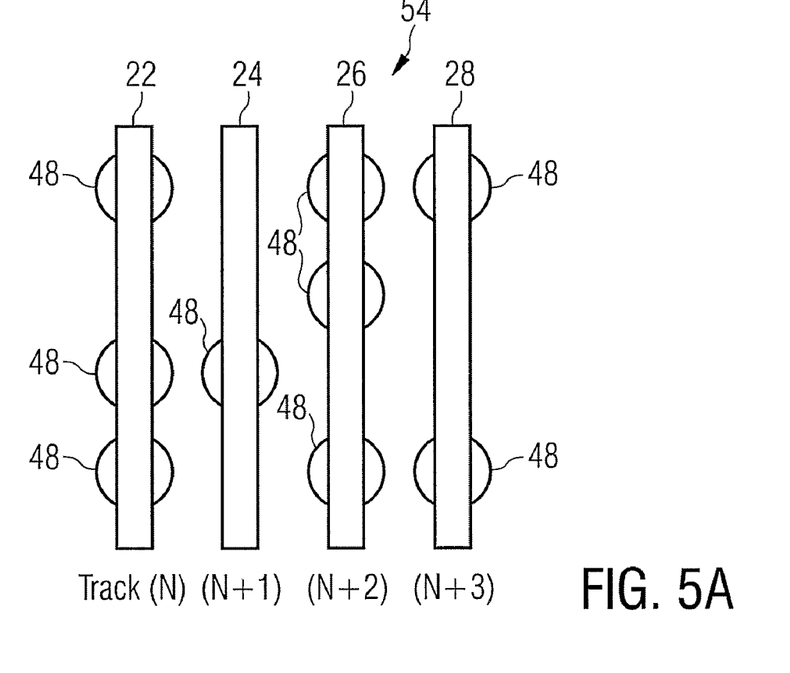
FIG. 5A shows a different embodiment of data lines with pre-recorded pits.
Figure 5B:
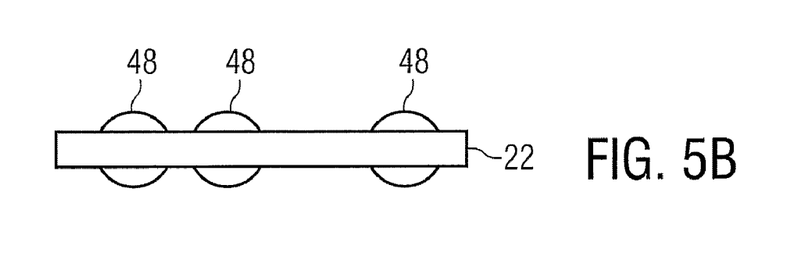
FIG. 5B shows the data line 22 of FIG. 5A.
Figure 5C:
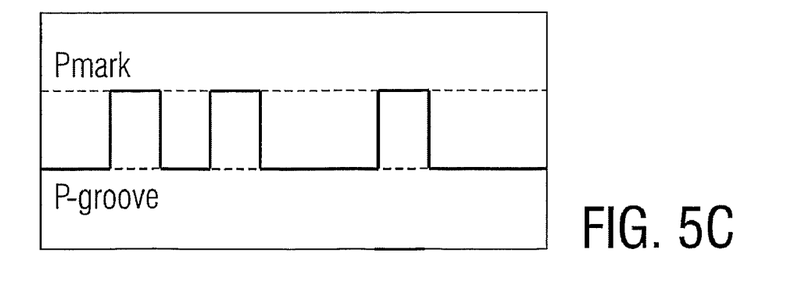
FIG. 5C shows the laser pulse pattern used to create the data line in accordance with FIG. 5B.

FIG. 5A shows a different embodiment of data lines with pre-recorded pits, FIG. 5B shows the data line 22 of FIG. 5A and FIG. 5C shows the laser pulse pattern used to create the data line in accordance with FIG. 5B. Also in this case the pulse power is not given as a function of time but as a function of the Cartesian coordinates, wherein the pulse power as a function of time again is derived from mapping that follows from the synchronized writing.

The examples shown in FIGS. 4 and 5 can for example be used for a flash ROM card.

Figure 6:
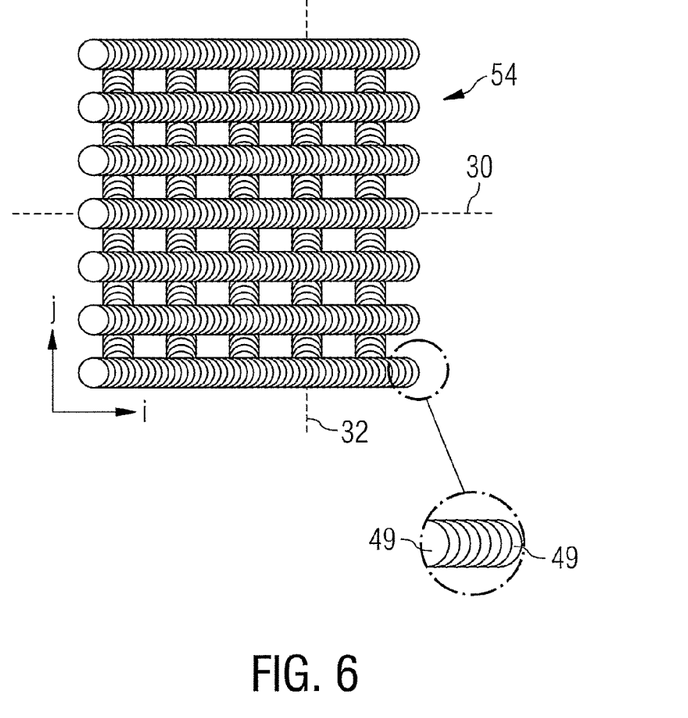
FIG. 6 shows a two-dimensional relief structure obtained by writing continuous grooves via synchronized positioning of partially overwriting marks.

FIG. 6 shows a two-dimensional relief structure 54 obtained by writing continuous grooves via synchronized positioning of partially overwriting marks 49 arranged in straight tracks 30, 32.

Figure 7:
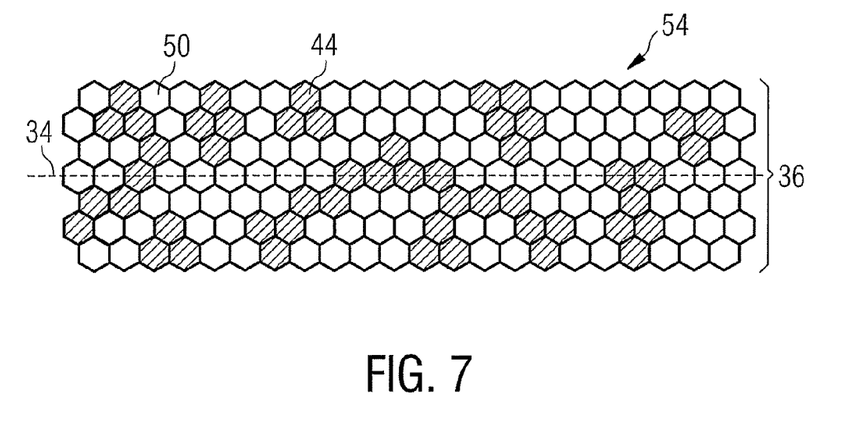
FIG. 7 is a top view of a two-dimensional meta track.

FIG. 7 shows an example of a two-dimensional data pattern 54 which is provided in form of a straight meta-track 36 which is formed by a plurality of adjacent straight tracks 34. Besides the matrix level 50 (back-ground material) there do exist only pits 54 which all comprise the same depth.

Figure 8:
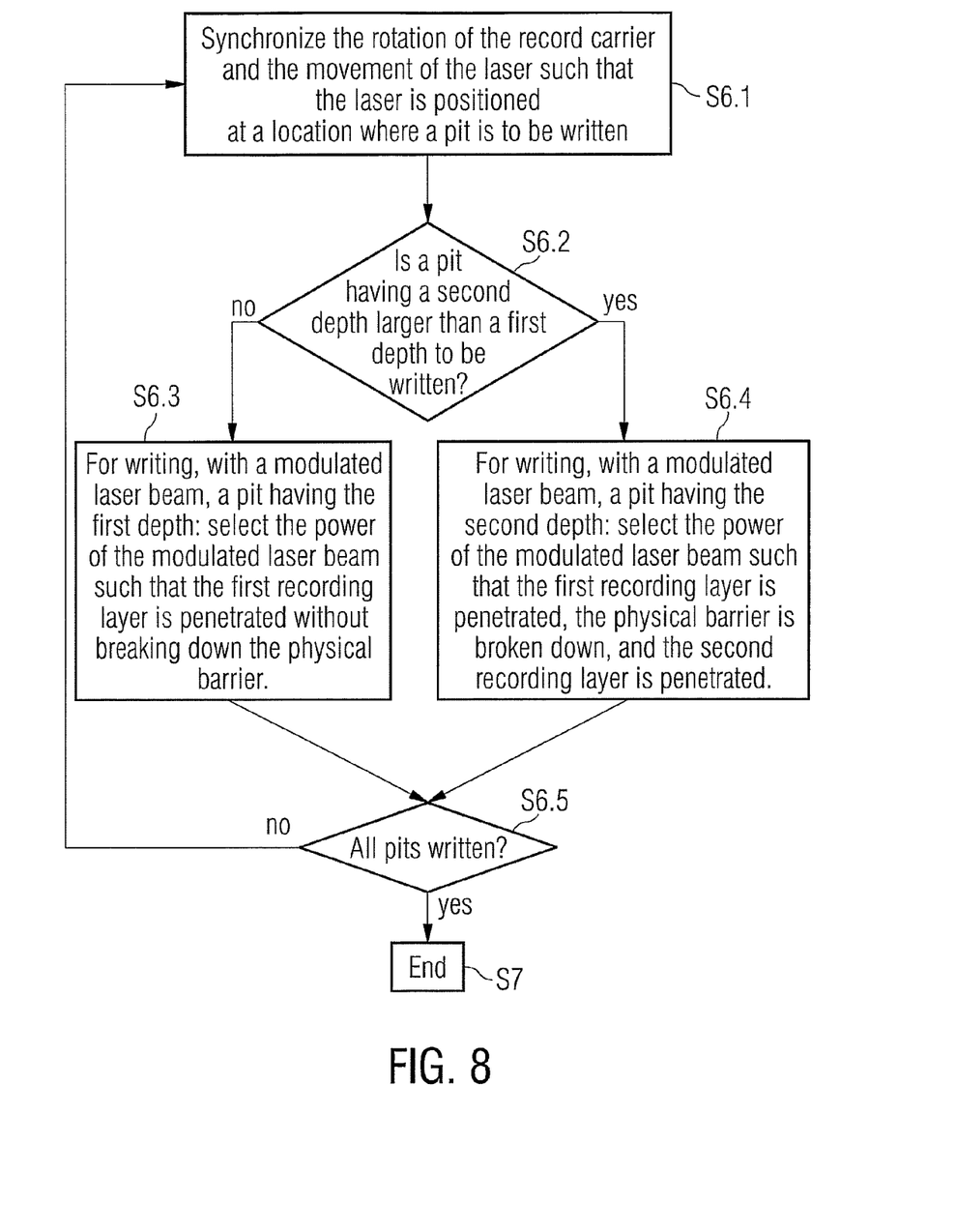
FIG. 8 is a flow chart illustrating in more detail the synchronization in accordance with the invention for a case in which pits with different depths are written.
Figure 9:
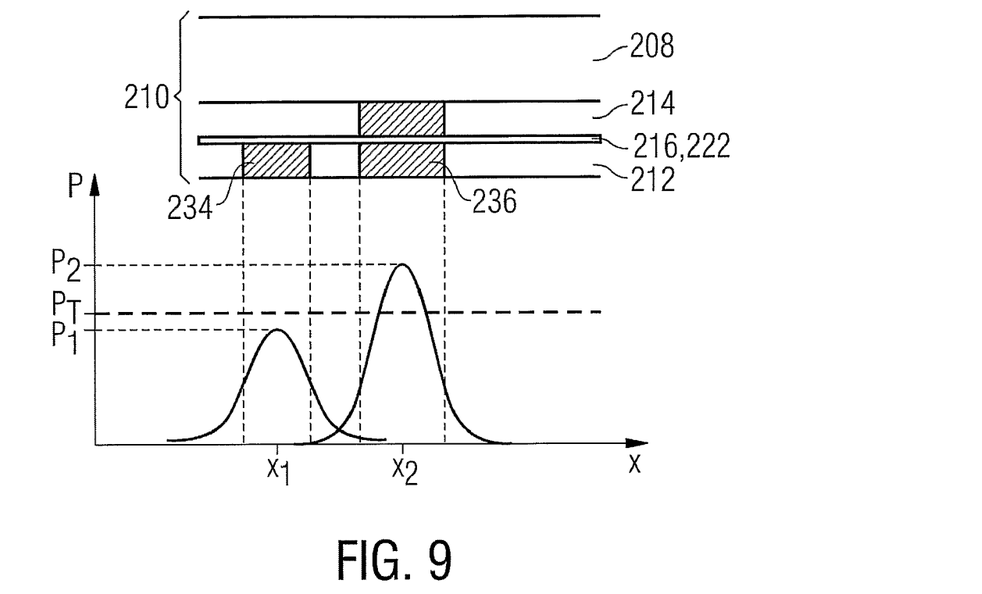
FIG. 9 schematically illustrates the above mentioned first general solution, wherein the record carrier is depicted in a sectional view, and it also illustrates the application of two different laser power levels.

FIG. 8 is a flow chart illustrating in more detail the synchronization in accordance with the invention for a case in which pits with different depths are written. The steps shown in FIG. 8 may for example substitute step S6 of FIG. 1. The method illustrated in FIG. 8 may for example be carried out with a record carrier as illustrated in FIG. 9. Such a record carrier 210 comprises a substrate 208 on which a second photoresist recording layer 214 is spincoated. An interface layer 222 forming a physical barrier 216 is provided between the second recording layer 214 and a first recording layer 212, which is also formed by a photoresist. With such a record carrier 210 the method in accordance with FIG. 8 may be carried out in the following way.

In step S6.1 the rotation of the record carrier and the movement of the laser is synchronized such that the laser is positioned at a location where a pit is to be written.

In step S6.2 it is determined whether a pit of a second depth larger than a first depth is to be written. If this is not the case, the method proceeds to step S6.3.

In step S6.3, for writing a pit 234 (FIG. 9) having the first depth, the power of the modulated laser beam is selected such that the first recording layer 212 (FIG. 9) is penetrated without breaking down the physical barrier 216 (FIG. 9). This laser power level is indicated as $P_1$ in FIG. 9.

If it is determined in step S6.2 that a pit having a second depth larger than the first depth is to be written, it is proceeded to step S6.4.

In step S6.4, for writing a pit 236 (FIG. 9) having the second depth, the power of the modulated laser beam is selected such that the first recording layer 212 (FIG. 9) is penetrated, the physical barrier 216 (FIG. 9) is broken down, and the second recording layer 214 (FIG. 9) is penetrated. A suitable laser power level for creating the pit 236 is indicated as $P_2$ in FIG. 9, wherein the power level $P_2$ is higher than a threshold power level $P_T$ which is required for breaking down the physical barrier 216.

In accordance with FIG. 8 it is determined in step S6.4 whether all pits have been written. If this is the case, the method ends in step S7 (FIG. 1). If further pits have to be written, the method again proceeds with step S6.1.

Figure 10A:
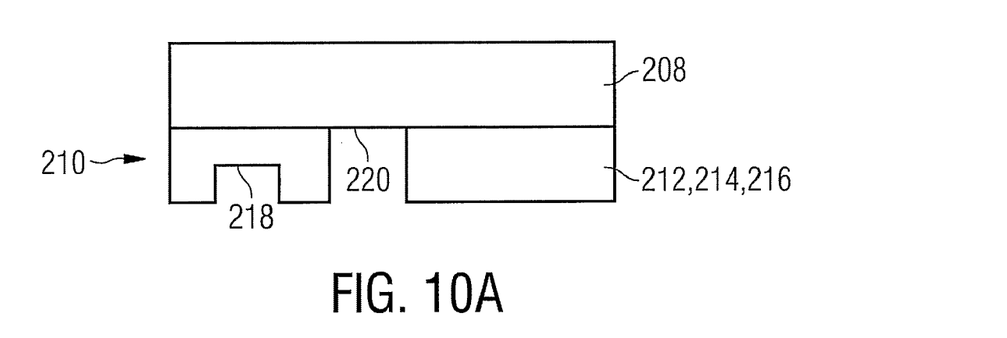
FIG. 10A illustrates the record carrier of FIG. 9 after development and etching in a sectional view.

FIG. 10A shows the record carrier 210 of FIG. 9 after the development. For developing the record carrier 210 based on photoresist it is flushed with development liquid (KOH, NaOH, or other alkaline liquid) which leads to a dissolution of the acid molecules leaving physical holes inside the recording layer. The resulting record carrier 210 comprises discrete pit depths 218, 220. For phase-transition mastering, both alkaline liquids (NaOH, KOH) and acids (HCl, HNO3) can be used as etch liquid to form a relief structure.

Figure 10B:
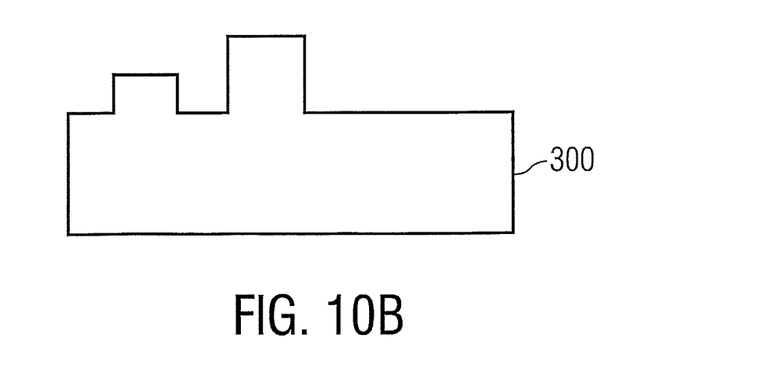
FIG. 10B schematically shows a stamper made on the basis of the record carrier in accordance with 10A.

FIG. 10B shows a stamper which is made on the basis of the optical record carrier 210 of FIG. 10A. To produce the stamper 300 a metallic layer is sputter-deposited over the record carrier 210, wherein the metal preferably is nickel. This nickel layer is grown to a thick and manageable substrate via electro-chemical plating. Subsequently the nickel substrate is separated from the record carrier 210 (master substrate) to end up with the stamper 300.

Figure 11:
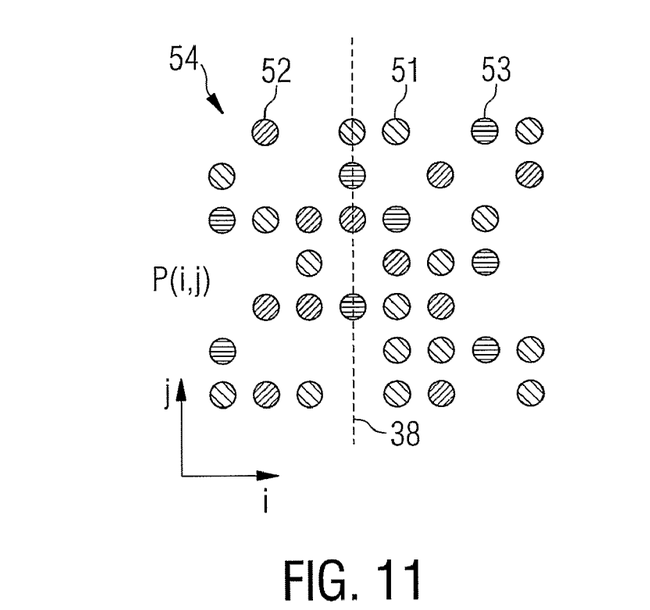
FIG. 11 is a top view of a multilevel pit pattern.

FIG. 11 shows a top view of a multi level pit pattern. The data 54 is arranged in straight tracks such that a rectangular matrix of pits 51, 52, 53 is formed. The pits 53 are deeper than the pits 51. Furthermore, the pits 53 are deeper than the pits 52. Such a data pattern can for example be formed with a record carrier having three recording layers with two physical barriers arranged between them.

Figure 12:
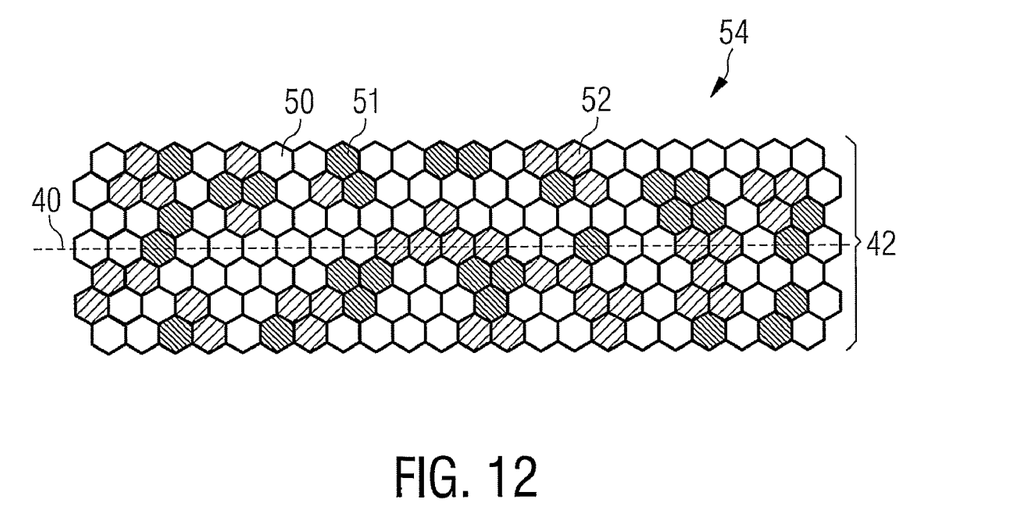
FIG. 12 is a top view of a two-dimensional multilevel meta track.

FIG. 12 shows a top view of a two-dimensional multilevel meta-track. The two-dimensional multi-level data pattern 54 comprises pits 51 and 52 having different discrete depths relative to the unwritten area 50. The two-dimensional-multi-level meta-track 42 is formed by a plurality of adjacent straight tracks 40.

Finally, it is to be noted that equivalents and modifications not described above may also be employed without departing from the scope of the invention, which is defined in the accompanying claims.

The invention claimed is:

1. A method for controlling a LBR (Laser Beam Recorder) suitable for mastering a record carrier by writing data in the record carrier in circular or spiral tracks and comprising:

means for rotating a record carrier;

means for moving a laser over the record carrier in a radial direction with reference to the rotation of the record carrier;

means for controlling the laser output power; and means for synchronizing the rotation of the record carrier, the movement of the laser and the laser output power;

synchronizing the rotation of the record carrier, the movement of the laser and the laser output power such that at least a part of the data is written in at least one track comprising a different arrangement than circular or spiral.

2. A method for controlling a LBR (Laser Beam Recorder) suitable for mastering a record carrier by writing data in the record carrier in circular or spiral tracks and comprising:
means for rotating a record carrier;
means for moving a laser over the record carrier in a radial direction with reference to the rotation of the record carrier;
means for controlling the laser output power; and
means for synchronizing the rotation of the record carrier, the movement of the laser and the laser output power;
synchronizing the rotation of the record carrier, the movement of the laser and the laser output power such that at least a part of the data is written in at least one track comprising a different arrangement than circular or spiral,
wherein for writing the part of the data a mapping between Cartesian coordinates (x, y) and polar coordinates (R, θ) is performed.

3. The method according to claim 1, wherein the at least one track comprises an arrangement of a straight line.

4. The method according to claim 1, wherein the part of said data is provided in the form of pits.

5. The method according to claim 4, wherein at least some of the pits overlap.

6. The method according to claim 4, wherein at least some of the pits have different depths.

7. The method according to claim 1, wherein at least part of said data is provided in the form of pits having different depths, wherein the record carrier comprises a first recording layer and at least a second recording layer between which there is provided a physical barrier leading to discrete pit depths.

8. The method according to claim 1, wherein the part of data is written in the form of a straight line comprising local broadenings.

9. The method according to claim 1, wherein the part of data is written in the form of straight line comprising local necks.

10. The method according to claim 1, wherein the record carrier is intended to be used in connection with the creation of a stamper.

11. The method according to claim 10, wherein the stamper is intended to be used for producing (optical) data carriers which are intended to be readout without being rotated.

12. The method according to claim 10, wherein the stamper is intended to be used for printing, especially for microcontact printing.

13. A method for controlling a LBR (Laser Beam Recorder) suitable for mastering a record carrier by writing data in the record carrier in circular or spiral tracks and comprising:
means for rotating a record carrier;
means for moving a laser over the record carrier in a radial direction with reference to the rotation of the record carrier;
means for controlling the laser output power; and
means for synchronizing the rotation of the carrier, the movement of the laser and the laser output power;
synchronizing the rotation of the record carrier, the movement of the laser and the laser output power such that at least a part of the data is written in at least one track comprising a different arrangement than circular or spiral;
wherein the part of said data is provided in the form of pits and
wherein the pits are located at intersections of virtual lines lying in the plane of the record carrier and virtual columns lying in the plane of the record carrier.

14. A method for controlling a LBR (Laser Beam Recorder) suitable for mastering a record carrier by writing data in the record carrier in circular or spiral tracks and comprising:
means for rotating a record carrier;
means for moving a laser over the record carrier in a radial direction with reference to the rotation of the record carrier;
means for controlling the laser output power; and
means for synchronizing the rotation of the record carrier, the movement of the laser and the laser output power;
synchronizing the rotation of the record carrier, the movement of the laser and the laser output power such that at least a part of the data is written in at least one track comprising a different arrangement than circular or spiral, and wherein the track is a meta-track comprising a two dimensional data layout.

15. A LBR (Laser Beam Recorder) suitable for mastering a record carrier; by writing data in the record carrier in circular or spiral tracks and comprising:
means for rotating a record carrier;
means for moving a laser over the record carrier in a radial direction with reference to the rotation of the record carrier;
means for controlling the laser output power; and
means for synchronizing the rotation of the record carrier, the movement of the laser and the laser output power;
wherein the means for synchronizing the rotation of the carrier, the movement of the laser and the laser output power are adapted to perform synchronization such that at least a part of the data is written in at least one track comprising a different arrangement than circular or spiral.

16. A LBR, (Laser Beam Recorder) suitable for mastering a record carrier; by writing data in the record carrier in circular or spiral tracks and comprising:
means for rotating a record carrier;
means for moving a laser over the record carrier in a radial direction with reference to the rotation of the record carrier;
means for controlling the laser output power; and
means for synchronizing the rotation of the record carrier, the movement of the laser and the laser output power;
wherein the means for synchronizing the rotation of the record carrier, the movement of the laser and the laser output power are adapted to perform synchronization such that at least a part of the data is written in at least one track comprising a different arrangement than circular or spiral; and
wherein the means for synchronization are adapted to perform a mapping between Cartesian coordinates (x, y) and polar coordinates (R, θ).

* * * * *